United States Patent
Noniewicz et al.

(10) Patent No.: US 9,579,775 B2
(45) Date of Patent: Feb. 28, 2017

(54) DETACHABLE BLOCKING DEVICE, IN PARTICULAR ON A CLAMPING TOOL

(71) Applicant: WOLFCRAFT GMBH, Kempenich (DE)

(72) Inventors: Zbigniew Noniewicz, Kempenich (DE); Hans-Jürgen Schüller, Königsfeld (DE)

(73) Assignee: WOLFCRAFT GMBH, Kempenich (DE)

( * ) Notice: Subject to any disclaimer, the term of this patent is extended or adjusted under 35 U.S.C. 154(b) by 0 days.

(21) Appl. No.: 14/767,447

(22) PCT Filed: Feb. 11, 2014

(86) PCT No.: PCT/EP2014/052655
§ 371 (c)(1),
(2) Date: Aug. 12, 2015

(87) PCT Pub. No.: WO2014/124941
PCT Pub. Date: Aug. 21, 2014

(65) Prior Publication Data
US 2015/0375369 A1    Dec. 31, 2015

(30) Foreign Application Priority Data

Feb. 14, 2013    (DE) .................. 10 2013 101 479

(51) Int. Cl.
| *B25B 5/16* | (2006.01) |
| *B25B 5/06* | (2006.01) |
| *F16B 2/18* | (2006.01) |

(52) U.S. Cl.
CPC .............. *B25B 5/068* (2013.01); *F16B 2/185* (2013.01)

(58) Field of Classification Search
CPC  B25B 5/00; B25B 5/067; B25B 5/068; B25B 5/082
See application file for complete search history.

(56) References Cited

U.S. PATENT DOCUMENTS

| 6,575,442 B2 * | 6/2003 | Klimach | ................. B25B 5/068 269/170 |
| 7,040,609 B1 * | 5/2006 | Liou | ....................... B25B 5/068 269/3 |

(Continued)

FOREIGN PATENT DOCUMENTS

| CA | 2304718 A1 | 2/1999 |
| DE | 202011003465 U1 | 5/2011 |

(Continued)

*Primary Examiner* — Lee D Wilson
(74) *Attorney, Agent, or Firm* — Lucas & Mercanti, LLP; Klaus P. Stoffel (57) ABSTRACT

A detachable blocking device, in particular on a clamping tool, having a blocking element, which blocks the displacement capability of a rod in at least one detachment direction in a blocking position, and a detachment member, which displaces the blocking element into a release position when moved from a default position into a detachment position, in which release position the rod can be displaced at least in the detachment direction. A brake element, in a braking position, acts on the rod so that the rod can only be displaced after neutralization of a braking force acting against the displacement direction of the rod, which braking force does not have to be neutralized in a sliding position of the brake element. The brake element has a brake lever and/or can be brought into its sliding position by pivoting an arm of the detachment member having a detachment lever.

13 Claims, 7 Drawing Sheets

(56) References Cited

U.S. PATENT DOCUMENTS

| | | | | |
|---|---|---|---|---|
| 7,513,492 | B1* | 4/2009 | Kuo | B25B 5/068 269/3 |
| 8,016,276 | B2* | 9/2011 | Geier | B25B 5/068 269/254 CS |
| 2006/0226588 | A1* | 10/2006 | Khachatoorian | B25B 5/068 269/6 |
| 2015/0375369 | A1* | 12/2015 | Noniewicz | F16B 2/185 24/528 |

FOREIGN PATENT DOCUMENTS

| | | | |
|---|---|---|---|
| EP | 0997232 | B1 | 10/2002 |
| WO | 2012068033 | A2 | 5/2012 |

* cited by examiner

DETACHABLE BLOCKING DEVICE, IN PARTICULAR ON A CLAMPING TOOL

The present application is a 371 of international application PCT/EP2014/052655, filed Feb. 11, 2014, which claims priority of DE 20 2013 101 479.8, filed Feb. 14, 2013, the priority of these applications is hereby claimed and these applications are incorporated herein by reference.

BACKGROUND OF THE INVENTION

The invention relates to a detachable blocking device, in particular on a clamping tool, for example on a clamp, comprising a blocking element, which blocks the displacement capability of a rod at least in a detachment direction in a blocking position, and a detachment member, which displaces the blocking element into a release position when moved from a default position into a detachment position, in which release position the rod can be displaced at least in the detachment direction.

Furthermore, the invention also relates to a clamp comprising a rod bearing a first clamping jaw and a housing bearing a second clamping jaw, said housing having a drive member which, when actuated several times one after the other, displaces the rod progressively in a clamping direction which is opposed to the detachment direction.

Such a clamp is described in EP 0 997 232 B1. A blocking element, which in a blocking position blocks the displacement capability of the rod in the detachment direction, is located inside the housing. The two clamping jaws can be brought into a clamping position by the drive member. To this end the two clamping jaws can be moved towards one another or away from one another. In the latter case the clamp operates as a spreader clamp. A detachment member is provided which, when it is displaced from a default position, displaces the blocking member into a release position in which the rod can be displaced both in the detachment direction and also in the clamping direction opposed thereto. The blocking element is formed there by a steel plate having a window through which the rod is guided. In the blocking position the window edges dig into surface portions of the rod. If the detachment member is actuated, the blocking element is brought out of the tilted position, so that the rod can be displaced through the window. The detachment member cooperates there with the blocking element in such a way that by means of a displacement, occurring several times one after the other, of the detachment member beyond the detachment position the rod can be displaced progressively in the detachment direction. In this case the blocking element is pushed by the detachment member in the clamping direction over the track, wherein a return displacement spring is tensioned. The return displacement spring is capable of bringing the blocking element into a tilted position, in order to displace the blocking element together with the rod fastened thereto.

SUMMARY OF THE INVENTION

The object of the invention is to make functionally advantageous modifications to a detachable blocking device or a clamping tool equipped therewith.

First of all and primarily a brake element is proposed. The blocking element exhibits, at least in its blocking position, a movement-inhibiting effect in relation to the rod in the detachment direction. If the blocking element is brought from the default position into the detachment position, it depends upon the particular construction of the blocking device or of the clamping tool whether the rod can be displaced freely, that is to say without significant friction, relative to the blocking element. With the brake element proposed according to the invention a displacement of the rod in the detachment position is only possible after a braking force has been neutralized. According to the invention the brake element can be brought from its braking position into a sliding position.

This can take place by a physical displacement of the brake element. In the sliding position the additional braking force does not have to be neutralized. In the sliding position of the brake element the braking force is not effective. The braking force is canceled here. It may be provided that in the sliding position the rod can be displaced solely by the action of gravity. However, the braking force is preferably so great that in the braking position the rod can be displaced not only due to gravity. In a modification of the invention it is provided that the brake element can be brought from the braking position into the sliding position by a displacement of the detachment member beyond the detachment position. The brake element can have a brake flank which in the braking position is subjected to force and bears against a surface portion of the rod. The rod is then preferably held in the braking position by static friction. The braking force is then a frictional force which is exerted by the preferably spring-loaded brake flank on the surface portion of the rod. The displacement of the brake element from the braking position into the sliding position then causes the brake flank to become detached from the rod, and then the frictional force is canceled. The rod may be a flat steel rod which in relation to the action of clamping jaws can form a traction rod or a push rod. The brake element may be a brake lever. The brake lever may have one arm. The brake lever is preferably mounted on a housing so as to be pivotable about a bearing journal, said housing also accommodating the detachment member and the blocking member. The brake lever can have axial extensions which engage in corresponding bearing openings in the housing wall. The detachment member can also be associated with the housing by being pivotable about a bearing journal. The detachment member may form a lever with two arms. One lever arm extends out of the housing as an actuating portion. Another lever arm can act on the brake element when the detachment lever is pivoted. Preferably the brake element is only acted upon by the detachment lever when the detachment lever has displaced the blocking element a certain distance along the track, wherein during this displacement of the blocking element over the track the position of the track is secured by the brake element. The brake element is preferably acted on by means of the blocking element. To this end the blocking element is acted upon by the detachment lever and in turn acts on the brake element. The blocking element can have a window through which the rod is guided. A jamb portion of the window, which may be a narrow side of the window, acts in the braking position on a portion of the rod, said portion preferably being a narrow side portion. The brake element is preferably held in the braking position by a spring, in particular a compression spring. If the brake element rests with its brake flank frictionally on the surface of the rod, the frictional force is generated by the spring. The spring preferably extends in the displacement direction of the rod. Its direction of action is its direction of extension. According to the invention the blocking element may be formed from a steel plate having a window. The rod is guided through the window. The window forms edges which in a blocking position, due to a tilting of the steel plate with the rod, cooperate with a surface portion of the rod when a force is exerted on the rod in the longitudinal direction. In this case the edges can dig into the surface portions of the rod. The rod can also be displaced in the clamping direction by similar means. For this purpose a clamp has a drive lever, which is pivotable. An arm of the drive lever protruding into the housing acts on a drive element. The drive element may likewise be formed from a steel plate having a window through which the rod is guided. If the drive lever is pivoted, the drive elements tilt on the rod. They are displaced relative to the housing when the drive lever is pivoted and they entrain the rod in the clamping direction. The blocking element is then held in the blocking position by a return displacement spring. In this way the clamp can be brought into a clamping position. In order to bring the clamp out of the clamping position, which may also be a spreading position, the detachment member, that is to say preferably the detachment lever, is to be actuated. The blocking element is thereby brought into its detachment position. It can be pushed further over the rod by further pivoting of the detachment member against the return displacement spring. In this case the rod is held in position by the brake element. If the detachment member is released, it is displaced by a spring back into the default position. The blocking element tilted with the rod is pulled back by the return displacement spring into the default position, the rod being displaced therewith. If the detachment member, that is to say in particular the detachment lever, is displaced into an end position, the brake element is taken out of action. The brake element then leaves its braking position and adopts a sliding position, in which the rod can move freely through the housing. Thus with the device according to the invention both a progressive displacement of the rod in the clamping direction and also a progressive displacement of the rod in the detachment direction is possible. This takes place in each case by actuation several times of either a drive lever or a detachment lever. The clamp according to the invention has at the end of the rod a clamping jaw of which the clamping surface lies opposite a clamping surface of a clamping jaw fixed to the housing. The clamping jaw associated with the rod may, however, also have a clamping surface which is directed away from the clamping surface of the clamping jaw fixed to the housing. In this case the clamp is a spreader clamp.

An embodiment of the invention is explained below with reference to the appended drawings. In the drawings.

BRIEF DESCRIPTION OF THE DRAWING

DETAILED DESCRIPTION OF THE INVENTION

Figure 1:
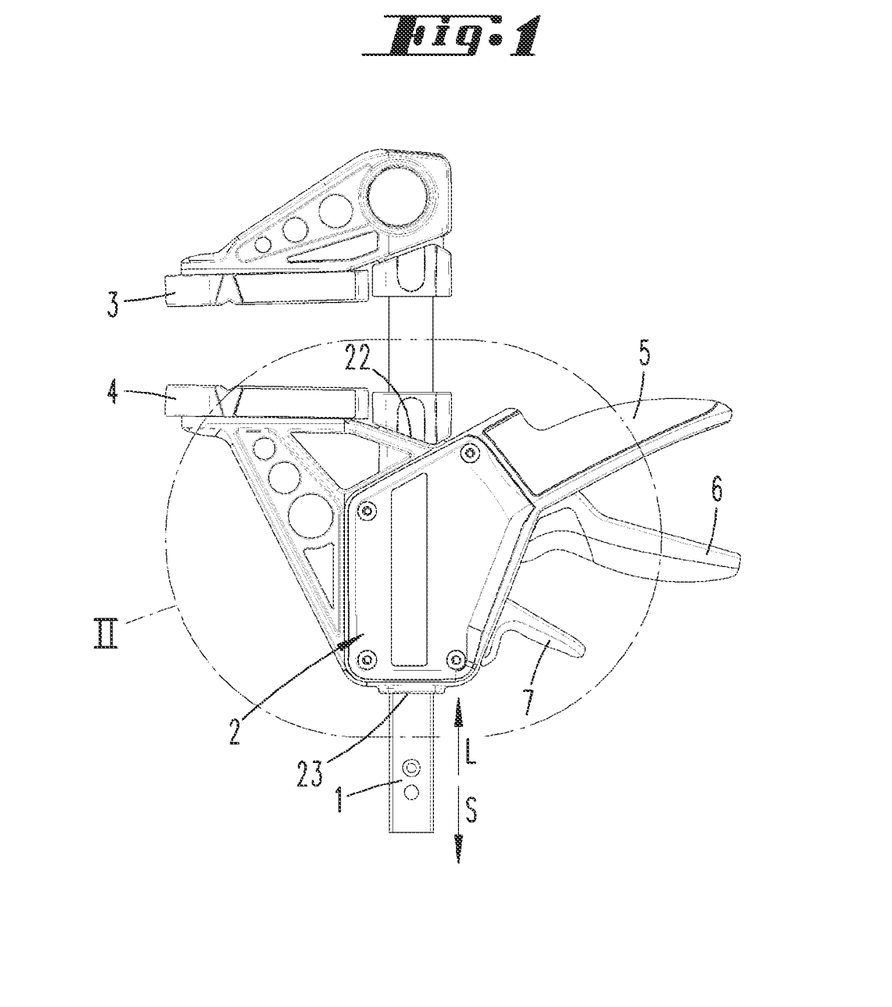
FIG. 1 shows a clamp according to the invention in a side view.

The drawings show a clamp with a housing 2 which has a housing chamber covered by a housing cover, wherein a drive gear and a detachable blocking device are disposed in the housing chamber. An arm of a detachment lever 7 and a drive lever 6 project out of the housing. The drive lever 6 or the detachment lever 7 are pivotable in the direction of a handle 5. On the side opposite the levers 6, 7 or the handle 5, the housing 2 has a fixed clamping jaw 4. The housing has two housing openings 22, 23, into which a push rod or a traction rod 1 is guided. A head bearing a clamping jaw 3 is fastened to the two ends of the rod 1. The track 1 can be displaced progressively in a clamping direction S by the drive lever 6. The track 1 can be displaced progressively in the detachment direction L opposed to the clamping direction S by the detachment lever 7. In the operating position illustrated in FIG. 1 the head bearing the clamping jaw 3 is fastened to the track 1 in such a way that the clamping surfaces of the clamping jaw 3, 4 face one another. If the track 1 is displaced in the clamping direction, the two clamping jaws 3, 4 move towards one another.

In an operating position which is not shown, the head bearing the clamping jaw 3 rests on the other end of the rod 1, so that the clamping jaws 3, 4 move away from one another when the track 1 is displaced in the clamping direction S.

In order to displace the rod 1, which is a steel strip with a rectangular cross-section, in the clamping direction S, the drive lever 6 must be pivoted in the direction of the handle 5. The drive lever 6 pivots about a pivot pin 19 which is disposed within the housing chamber. A drive cam 20 acts on one end of a drive element 8 which is formed by a double steel plate. In a non-actuated position the drive element 8 is supported on an abutment 31, so that the rod 1 can slide substantially freely through a window in the drive element 8. The compression spring 9 forms a restoring spring of the drive element 8 and holds the driving element 8 in the default position. If the outer arm of the two-armed drive lever 6 is pivoted, the other arm of the drive lever 6 forming the drive cam 20 pivots in the opposite direction and leads to tilting of the drive element 8 on the track 1. In the event of displacement of the drive lever 6 the drive element 8 is detached from the abutment 31 and is displaced in the clamping direction S, the rod being entrained due to the tilting. A blocking element 10 in its blocking position prevents a return displacement. The blocking element 10 is formed so that the rod 1 can be displaced in the clamping direction S relative to the blocking element 10. If the drive lever 6 is released, the restoring spring 9 displaces the drive element 8 again into the default position.

The two clamping jaws 3, 4 can be progressively displaced and brought into a clamping position by such actuation of the drive lever 6 several times.

In order to bring the clamp out of the clamping position into a detachment position, the arm of the detachment lever 7 projecting out of the housing 2 must be pivoted in the direction of the handle 5. The detachment lever 7 has a bearing eye 13 by which the detachment lever 7 is pivotably supported on a bearing journal 12 fixed on the housing 2. An arm 11 of the detachment lever 7 protruding into the housing has a lever end 18 which can act against a blocking element 10.

Figure 2:
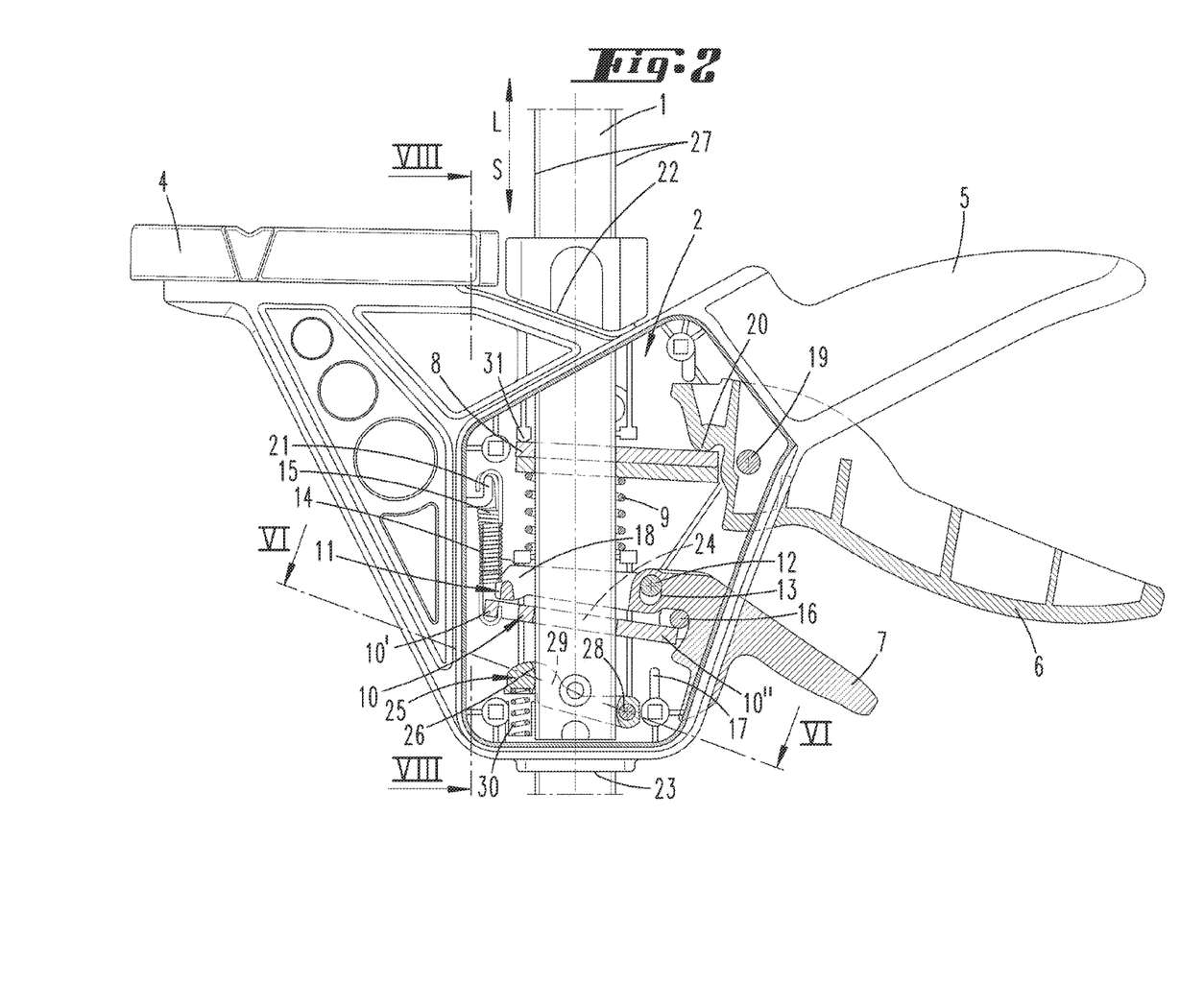
FIG. 2 shows, enlarged, the detail II-II in FIG. 1 with the housing cover removed in a default position.

In the blocking position which corresponds to the default position of the detachment lever 7 illustrated in FIG. 2, one end 10" of the blocking element 10 is supported on a stop 16 of the housing 2. The opposite end 10', which can also be acted on by the lever end 18, is acted on in the detachment direction L by means of a restoring spring 14 applied thereto. The restoring spring 14 is fastened with its other end to a fastening point 21 on the housing.

The blocking element 10 has a window 24 which has sharp window edges. The rod 1 is guided through the window 24. The restoring spring 14 holds the blocking element 10 in a tilted position, in which the edges of the window perimeter are applied to the narrow sides 27 of the rod 1 in such a way that the rod 1 can be displaced not in the detachment direction L but in the clamping direction S relative to the blocking element 10.

Figure 3:
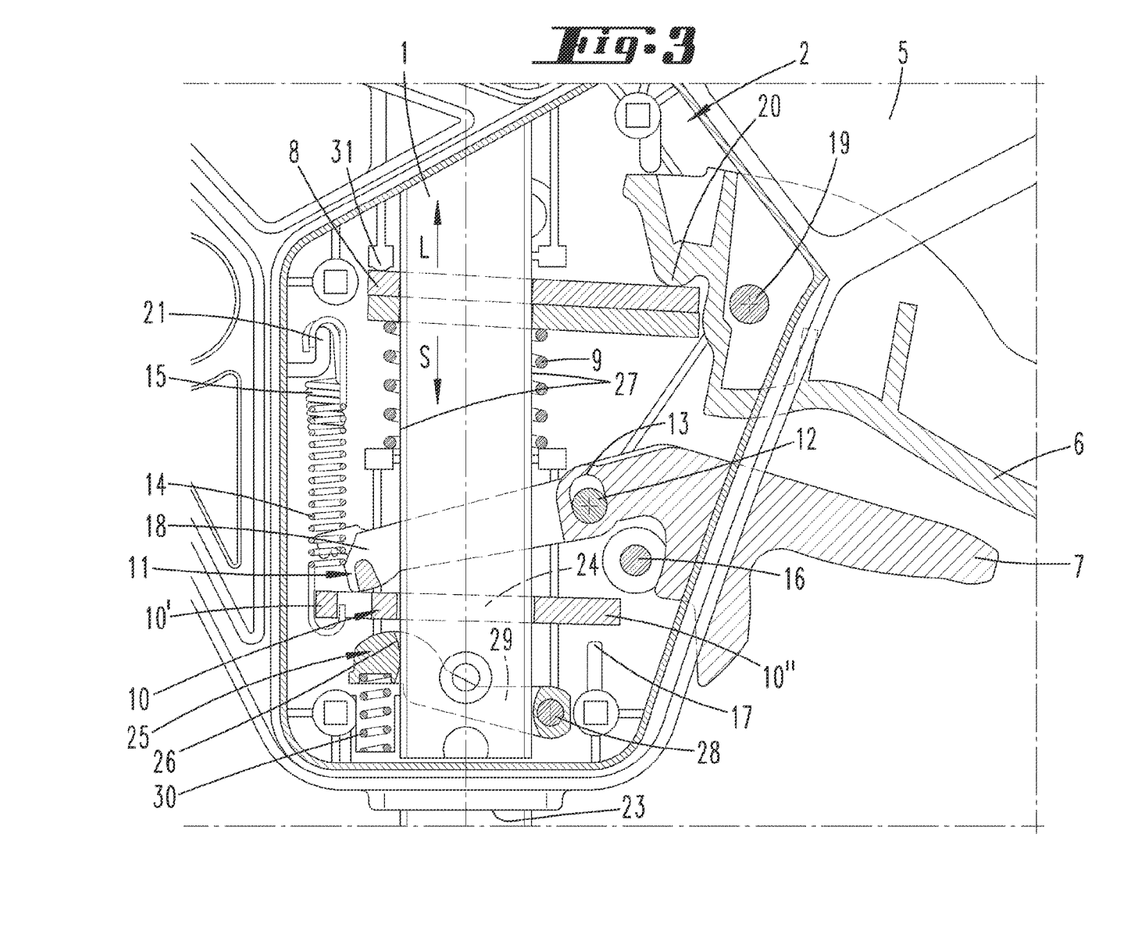
FIG. 3 shows a representation according to FIG. 2, but in a detachment position.

If the detachment lever 7 is pivoted into the detachment position illustrated in FIG. 3, which takes place by application of the lever end 18 in the region of the end 10' of the blocking element, that is to say in the region of the point of application of the restoring spring 14, the other end 10" is detached from the stop 16. In this case the edges of the window 24 move out of the impingement position, so that the rod 1 can be displaced not only in the clamping direction S, but also in the detachment direction L relative to the blocking element 10.

In order to prevent the rod 1 from being easily displaced relative to the housing 2 in this detachment position, a brake element 25 is disposed inside the housing chamber of the housing 2. The brake element 25 is supported in the housing so as to be pivotable about a pivot axis 28. For this purpose axle stubs 28 projecting from the brake element 25 engage in opposing openings in the housing walls.

Figure 6:
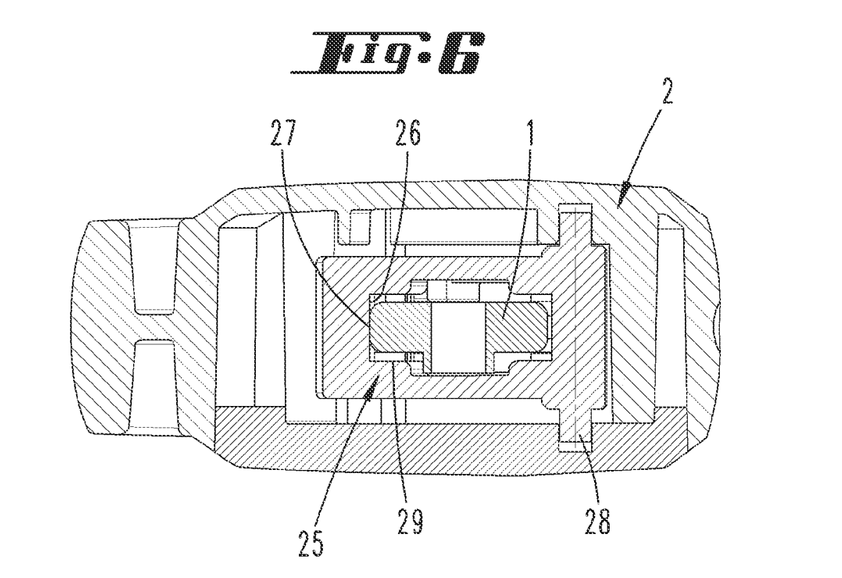
FIG. 6 shows a section along the line VI-VI in FIG. 2.
Figure 7:
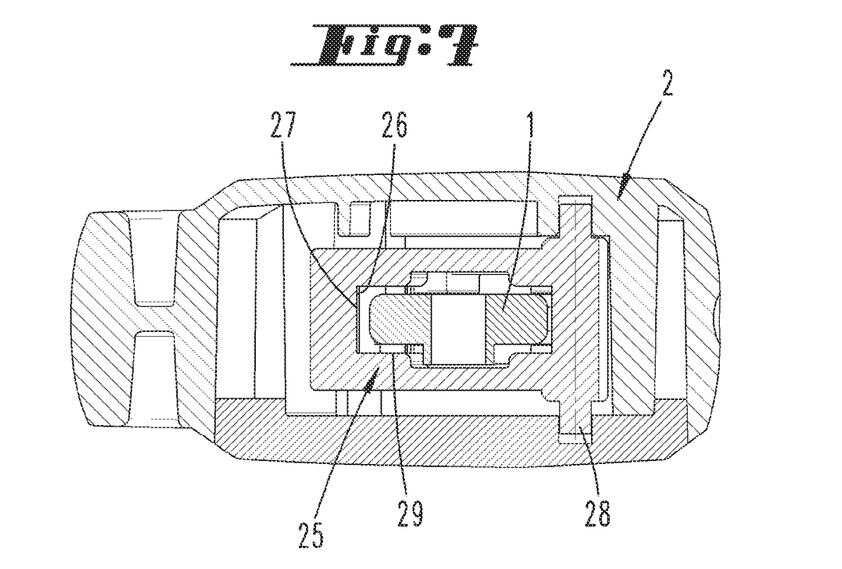
FIG. 7 shows a section along the line VII-VII in FIG. 5.
Figure 8:
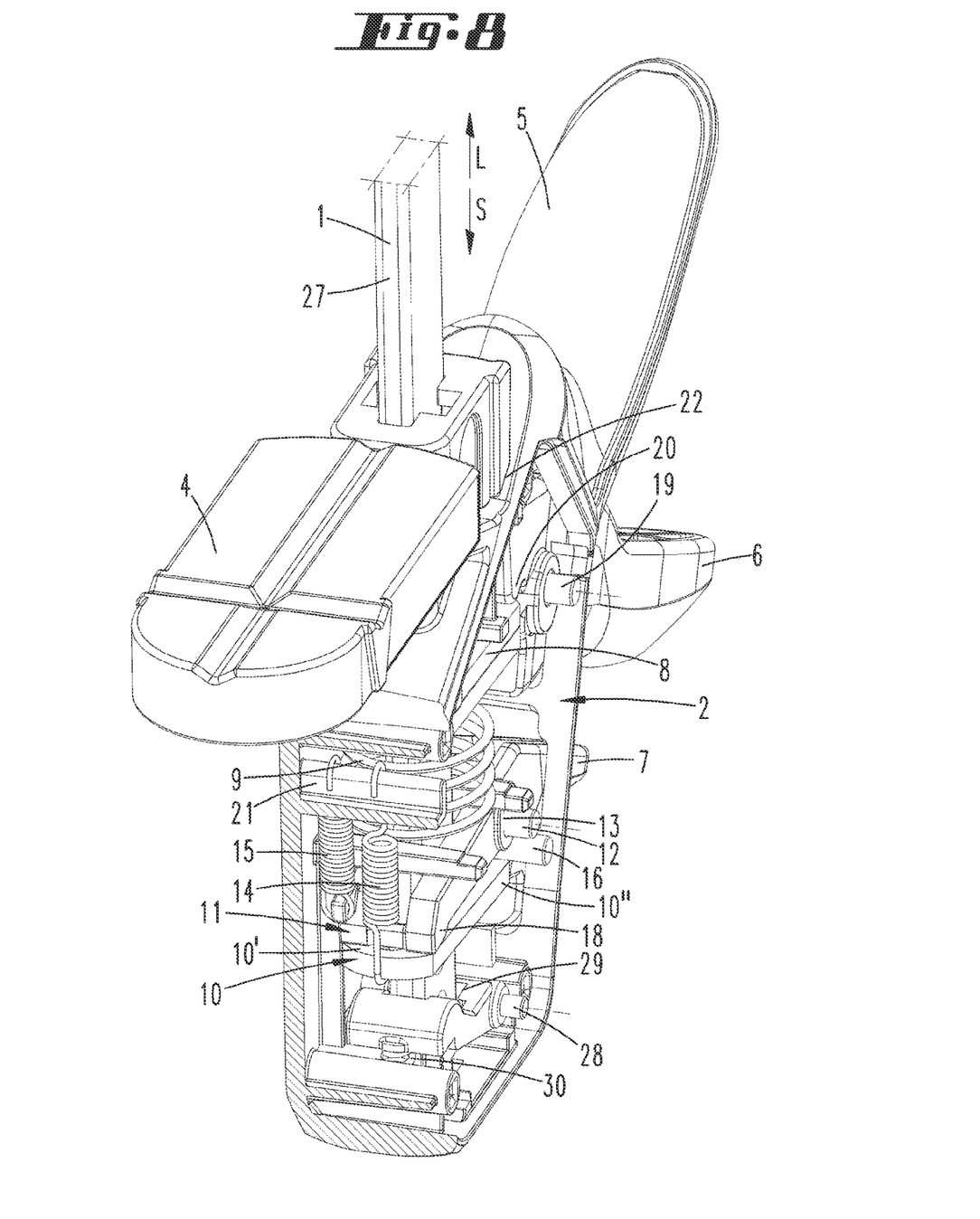
FIG. 8 shows a perspective representation, partially cut away, of the housing.

The brake element 25 formed as a brake lever has a rectangular window 29, through which the rod 1 extends. A narrow wall of the window forms a brake flank 26 which may have a rounded surface. In the braking position illustrated in FIG. 2 or 6 the brake flank 26 is pressed by the force of the spring 30 against a surface portion 27 of the rod 1. The surface portion 27 is the narrow side of the rod 1. The spring 30 is a compression spring and is located in a spring holding chamber. The direction of action thereof extends parallel to the displacement direction of the rod 1. The spring 30 is supported with its one end on the floor of its holding chamber. The other end of the spring 30 acts against the free end of the brake lever 25. Thus the spring generates a force which due to the articulation 28 is converted into a normal force which presses the brake flank 26 against the surface portion 27 of the rod. In this case a frictional force is generated. This force corresponds to a braking force which must be neutralized in order to displace the rod 1 in the braking position of the brake element 25 either in the clamping direction S or in the detachment direction L.

If, starting from the detachment position illustrated in FIG. 3, the detachment lever 7 is released, it is retracted into the default position by a restoring spring 15 which is associated with it which likewise is applied to the fastening point 21. In this case the lever end 18 is detached from the end 10' of the blocking element 10. The restoring spring 14 evolves a restoring force on the blocking element 10 which is greater than the braking force caused by the brake element 25. The consequence of this is that the return displacement of the blocking element 10 due to its tilting on the rod 1 entrains the rod 1 in the detachment direction L.

Figure 4:
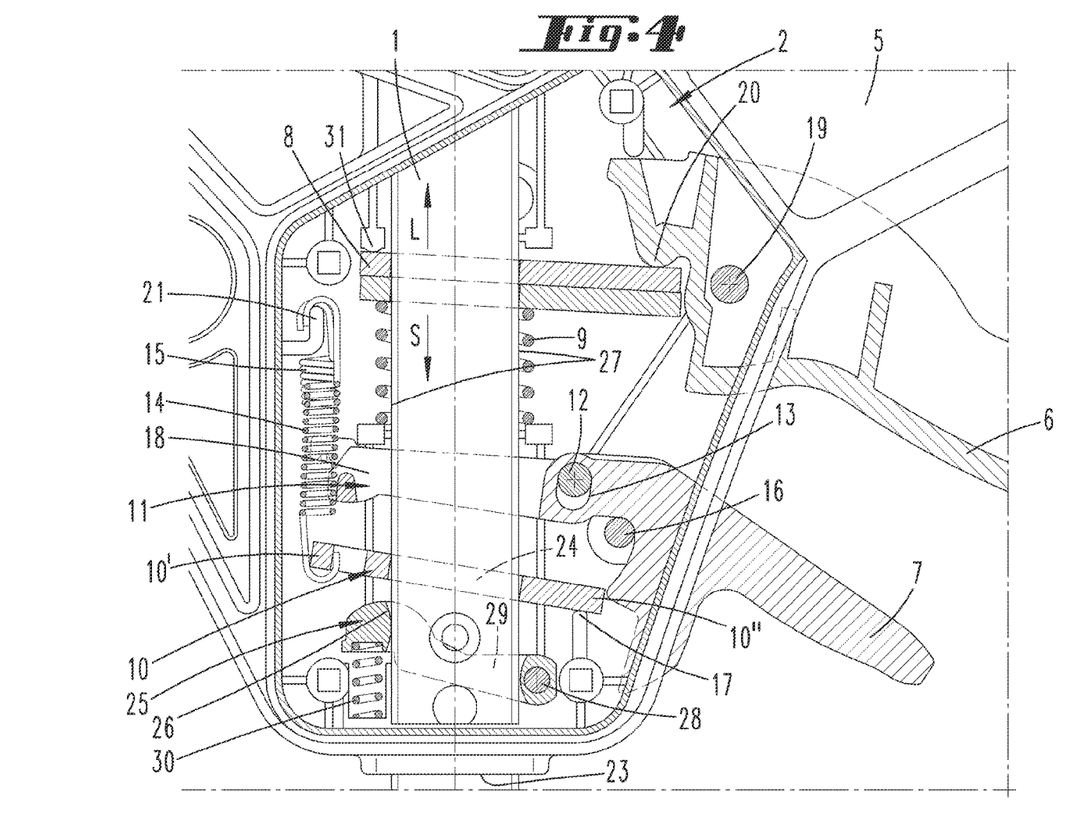
FIG. 4 shows a follow-on representation from FIG. 3 after pivoting back of a detachment lever from the detachment position into the default position.
Figure 5:
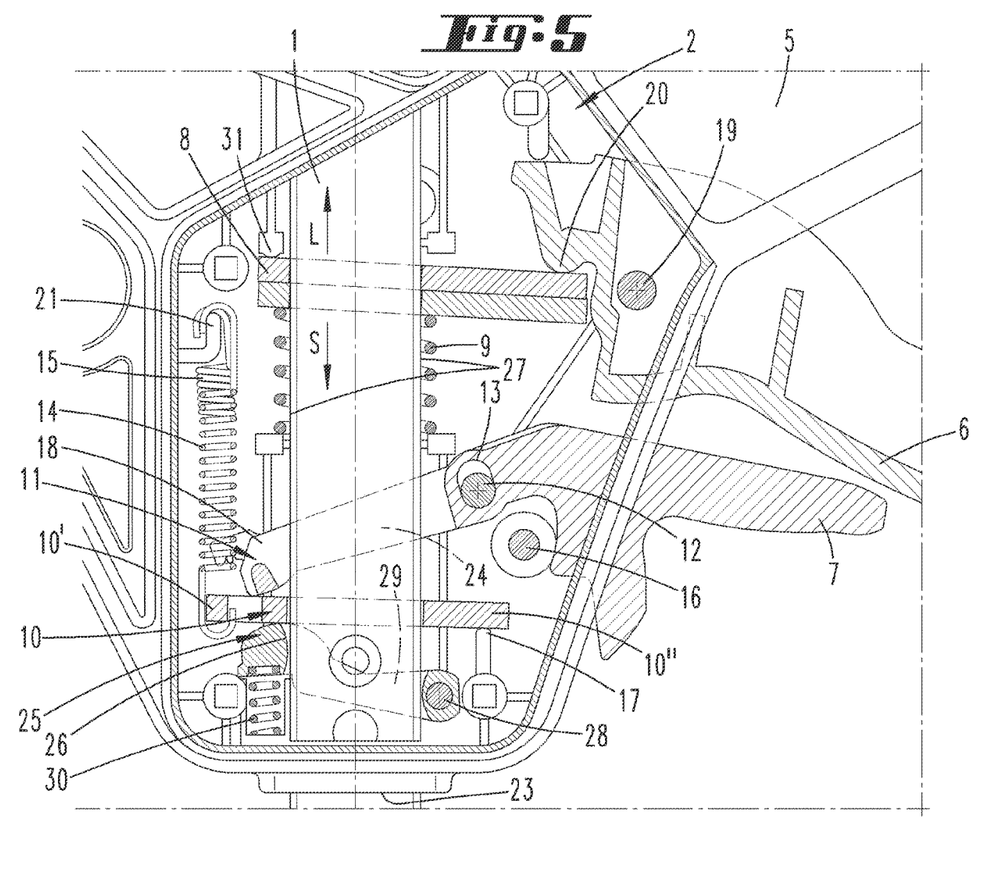
FIG. 5 shows a follow-on representation from FIG. 3 after further displacement of the detachment lever into a sliding position.

FIG. 4 shows an intermediate position in which the blocking element 10 has tilted on the rod 1 but has not yet moved. The detachment lever 7 has been detached from the blocking element 10, so that only the spring 14 is applied to the blocking element, in order to displace the blocking element 10 in the detachment direction L. The displacement takes place together with the rod 1.

If the detachment lever 7 is pivoted further, starting from the detachment position illustrated in FIG. 3, it displaces the blocking element 10 further in the direction of the brake element 25, since the blocking element 10 is disposed between the detachment lever 7 and the brake element 25.

In the final phase of the pivoting of the detachment lever 7, the free end of the brake element 25 is acted on by the blocking element 10. This corresponds to the brake element 25 being acted on by the detachment lever 7 with the interposition of the blocking element 10. This relative displacement leads to pivoting of the brake element 25 about its pivot axis 28, wherein the spring 30 is tensioned. Accompanied by this pivoting displacement of the brake element 25, the brake flank 26 is detached from the surface portion 27 of the rod 1, so that the brake element adopts its sliding position. In this sliding position the braking force to be neutralized for displacement of the rod 1 ceases. Moreover, since the blocking element 10 is supported on a stop 17 in such a way that the rod 1 can slide freely through the window 24, in this sliding position the rod 1 can be displaced merely by the action of gravity. It is easily guided into the windows 29 and 24.

If the detachment lever 7 is released again, the spring 30 displaces the brake element 25 from the sliding position back into the braking position, in which the brake flank 26 acts on the rod 1 so as to inhibit movement. The blocking element 10 is detached with its end 10" from the stop 17 and reaches a tilted position (FIG. 4), in which during its return displacement into the default position it entrains the rod 1 in the detachment direction L in the manner described above.

The flank on which the brake element 25 is acted on by the blocking element 10 is rounded. The spring 30 is supported to the rear of this rounding.

The return displacement spring 14 and the restoring spring 15 are in each case designed as tension springs.

The above statements serve for explanation of the inventions covered as a whole by the application, which in each case represent independent modifications of the prior art at least through the following combinations of features, namely:

A detachable blocking device, characterized by a brake element which in a braking position acts on the rod in such a way that the rod can only be displaced after neutralization of a braking force acting against the displacement direction of the rod, which braking force does not have to be neutralized in a sliding position of the brake element.

A detachable blocking device, which is characterized in that the brake element can be brought from the braking position into the sliding position by a displacement of the detachment member beyond the detachment position.

A detachable blocking device, which is characterized in that the brake element has a brake flank which in the braking position is subjected to force and bears against a surface portion of the rod, and in the sliding position is spaced apart from the surface portion.

A detachable blocking device, which is characterized in that the brake element (25) has a brake lever.

A detachable blocking device, which is characterized in that the brake element can be brought into its sliding position by pivoting of an arm of the detachment member having a detachment lever.

A detachable blocking device, which is characterized in that the brake element is pivotable about a pivot axis fastened to a housing accommodating the detachment member and the brake element.

A detachable blocking device, which is characterized in that the brake element has a window through which the rod is guided, wherein a portion of the jamb of the window forms the brake flank which in particular cooperates frictionally with the rod.

A detachable blocking device, which is characterized in that the brake element is acted on by a spring acting in the displacement direction of the rod.

A detachable blocking device, which is characterized in that the blocking element is a steel plate with a window through which the rod is guided, which window has edges which in the blocking position, due to a tilting of the steel plate with the rod, cooperate with the surface of the rod when a force is exerted on the rod in the detachment direction.

A clamp, which is characterized in that the rod can be displaced progressively in the detachment direction by means of a displacement, occurring several times one after the other, of the detachment member beyond the detachment position.

A detachable blocking device, which is characterized in that the brake element is acted upon in the detachment direction by return displacement spring.

A detachable blocking device, which is characterized in that the brake element strikes against a slot in the release position.

A clamp, which is characterized in that the housing has a detachable blocking device in particular according to one or more of the preceding claims.

All features disclosed are (per se, but also in combination with one another) essential to the invention. The entire content of the disclosure of the associated/appended priority documents (copy of the prior application) is hereby incorporated into the disclosure of the application, for the purpose of also including features of these documents in claims of the present application. The subordinate claims characterize, in their optionally independent version, independent inventive modifications of the prior art, in particular in order to file divisional applications on the basis of these claims.

List of reference signs

| | |
|---|---|
| 1 | rod |
| 2 | housing |
| 3 | clamping jaw |
| 4 | clamping jaw |
| 5 | handle |
| 6 | drive lever |
| 7 | detachment lever |
| 8 | drive element |
| 9 | restoring spring |
| 10 | blocking element |
| 11 | lever arm |
| 12 | bearing journal |
| 13 | bearing eye |
| 14 | return displacement spring |
| 15 | restoring spring |
| 16 | stop |
| 17 | stop |
| 18 | lever end |
| 19 | pivot pin |
| 20 | drive cam |
| 21 | fastening point |
| 22 | guide opening |
| 23 | guide opening |
| 24 | window |
| 25 | brake element |
| 26 | brake flank |
| 27 | surface portion |
| 28 | pivot axis |
| 29 | window |
| 30 | spring |
| 31 | abutment |
| L | detachment direction |
| S | clamping direction |

The invention claimed is:

1. A detachable blocking device, comprising: a blocking element that blocks displacement capability of a rod at least in a detachment direction in a blocking position; a detachment member that displaces the blocking element into a release position when moved from a default position into a detachment position, in which release position the rod is displaceable at least in the detachment direction; comprising a brake element which in a braking position acts on the rod so that the rod is only displaceable after neutralization of a braking force acting against the displacement direction of the rod, which braking force does not have to be neutralized in a sliding position of the brake element; and a drive lever that acts on a drive element to displace the rod in a clamping direction opposite to the detachment direction relative to the blocking element.

2. The detachable blocking device according to claim 1, wherein the brake element is movable from the braking position into the sliding position by a displacement of the detachment member beyond the detachment position.

3. The detachable blocking device according to claim 1, wherein the brake element has a brake flank that in the braking position is subjected to force and bears against a surface portion of the rod, and in the sliding position is spaced apart from the surface portion.

4. The detachable blocking device according to claim 3, wherein the brake element is bringable into the sliding position by pivoting of an arm of the detachment member having a detachment lever.

5. The detachable blocking device according to claim 3, wherein the brake element is pivotable about a pivot axis fastened to a housing accommodating the detachment member and the brake element.

6. The detachable blocking device according to claim 5, wherein the brake element has a window through which the rod is guided, wherein a portion of a jamb of the window forms the brake flank that cooperates frictionally with the rod.

7. The detachable blocking device according to claim 6, wherein the brake element is acted on by a spring acting in the displacement direction of the rod.

8. The detachable blocking device according to claim 7, wherein the blocking element is a steel plate with a window through which the rod is guided, that window having edges which in the blocking position, due to a tilting of the steel plate with the rod, cooperate with a surface of the rod when a force is exerted on the rod in the detachment direction.

9. The detachable blocking device according to claim 8, wherein the rod is displaceable progressively in the detachment direction by a displacement, occurring several times successively, of the detachment member beyond the detachment position.

10. The detachable blocking device according to claim 8, wherein the blocking element is acted on by a return displacement spring in the detachment direction.

11. The detachable blocking device according to claim 8, wherein the blocking element strikes against a stop in the release position.

12. The detachable blocking device according to claim 1, wherein the brake element has a brake lever.

13. A clamp, comprising: a rod bearing a first clamping jaw; and a housing bearing a second clamping jaw, said housing having a drive member which, when actuated several times successively, displaces the rod in a clamping direction that is opposed to a detachment direction, wherein the housing has a detachable blocking device according to claim 1.

* * * * *